June 13, 1939.  H. W. PARRISH ET AL  2,162,355
CONDUIT FORMING MECHANISM
Filed Oct. 26, 1933  3 Sheets-Sheet 1
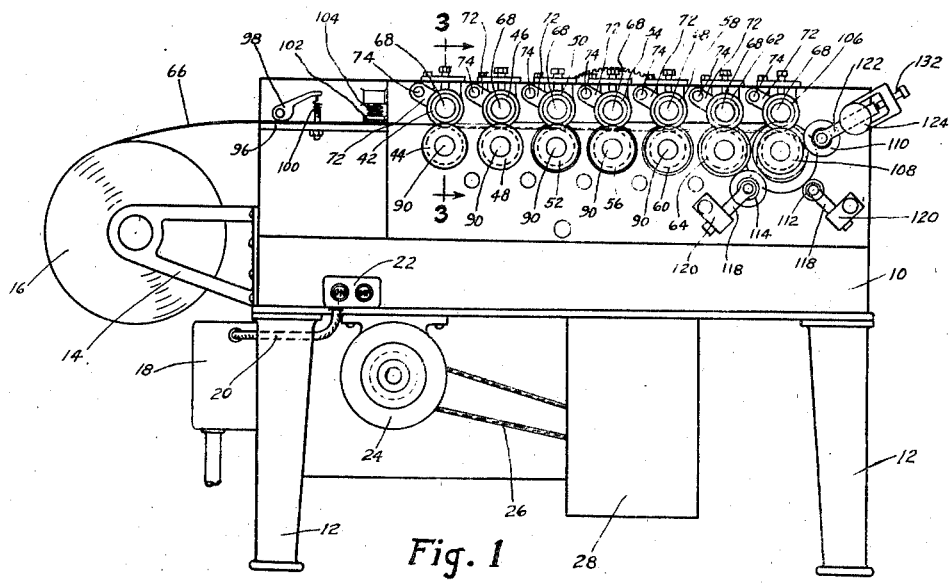
Fig. 1
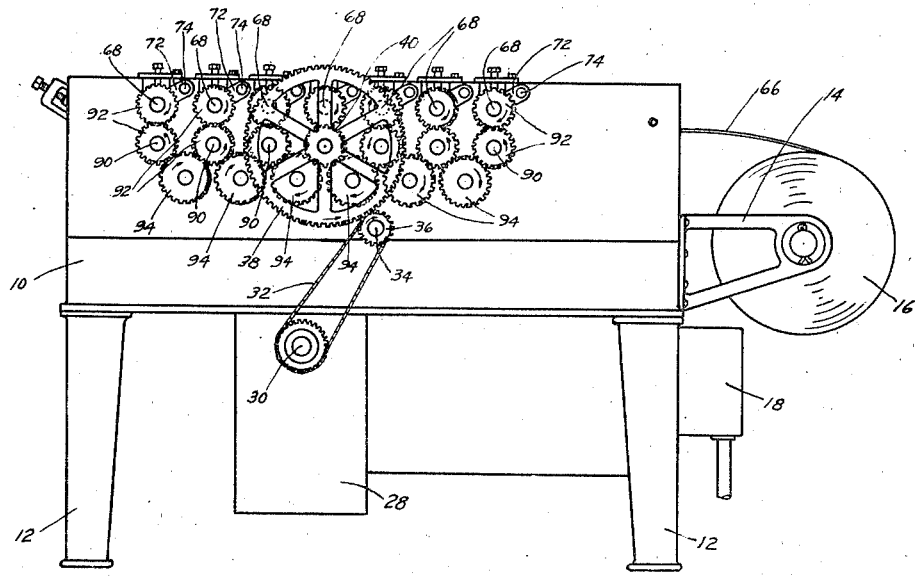
Fig. 2
INVENTORS
Hale W. Parrish
Lawrence G. Dickeson
BY
ATTORNEY INVENTOR.
Hale W. Parrish
Lawrence G. Dickeson

BY

ATTORNEY.

Patented June 13, 1939

2,162,355

UNITED STATES PATENT OFFICE 2,162,355

CONDUIT FORMING MECHANISM

Hale W. Parrish, South Bend, Ind., and Lawrence G. Dickeson, Niles, Mich., assignors to National Standard Company, Niles, Mich., a corporation of Michigan Application October 26, 1933, Serial No. 695,270

16 Claims. (Cl. 113—35)

This invention relates to machines for forming metal conduits, and is illustrated as embodied in a machine for helically winding a longitudinally-corrugated strip of metal to form a corrugated flexible conduit.

One object of the invention is to provide a machine of this character which is readily adjustable to change the diameter of the conduit being formed. Preferably the metal strip, after passing through the corrugating means, passes over a mandrel having a shape corresponding to the cross section of the corrugated strip. A bending roller or the like, which cooperates with the mandrel in bending the corrugated strip on a circular arc and winding it helically in the manner desired, is mounted adjacent the mandrel in such a manner that it can be readily adjusted about the periphery of the mandrel to cause the desired changes in the diameter of the conduit.

In the arrangement illustrated in the drawings the bending roller or its equivalent is carried by a slide or the like which is adjustable to move the roller toward and from the mandrel, and which slide is mounted in an angularly-adjustable support, so that by manipulating the slide and the support any desired position of the roller relatively to the mandrel may be obtained. There is also an adjustable guide, or a plurality of guides, which insure that the strip after being bent is properly positioned relatively to the next preceding and the next succeeding convolutions of the conduit.

In one very desirable arrangement, the mandrel is arranged in line with the forming rollers and the bending roller as well as the mandrel is power-driven and is adjustable about the axis of the mandrel. The bending roller and mandrel thus have a drawing as well as a bending action on the material, so that the formed steel strip is positively stretched over the mandrel as it is being bent into a helix thereover.

Another feature of the invention relates to mounting the rollers or other means for corrugating the metal strip in such a manner that they are held under adjustable spring pressure, while yet in case of something going wrong and it being necessary to separate the rollers this can be done easily and quickly without changing the adjustment, so that when the parts are again in place the springs or their equivalents are held under the same tension as before.

The above and other objects and features of the invention, including various novel combinations of parts and desirable particular constructions, will be apparent from the following description of the illustrative embodiment shown in the accompanying drawings, in which:

Figure 1 is a side elevation of the machine showing the series of corrugating rollers and the mandrel and the bending roller;

Figure 2 is a side elevation of the opposite side of the machine showing the intermeshing driving gears;

Figure 3:
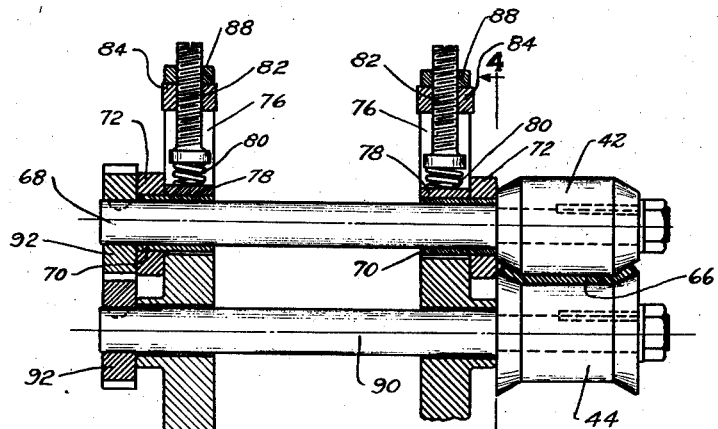
Figure 3 is a partial section on the line 3—3 of Figure 1 showing the mounting of the shafts of the machine and particularly the means for adjusting the pressure on the corrugating rollers.

The illustrated machine comprises a suitable base 10 supported on legs 12 and having at one end a pair of brackets 14 for rotatably supporting a reel 16 of material such as a long narrow strip of steel plated with copper or other bonding material on both sides.

The desirability of the use of this particular material, or a similar material, is more fully set forth in application No. 691,345, filed September 28, 1933, by Clayton C. Harrah, and which describes and claims the complete method of forming the corrugated conduit in a novel series of steps of which the winding operation performed by the machine of the present application forms one step. So far as the present application is concerned, however, it is not essential that this particular material be used inasmuch as this machine is capable of use in forming conduits of other kinds than that formed by the method of the above-mentioned application.

The conduit formed by the method of the above mentioned application, and one stage of which method is carried out in the machine of the present application, is fully described and is claimed in copending application No. 691,344, filed Sept. 28, 1933, by Clayton C. Harrah.

The base 10 supports a suitable switch and fuse-box 18 from which there leads a conduit 20 containing wires leading to a control switch 22 and a motor 24 mounted on the lower face of the base 10. The motor 24 is connected by means such as a sprocket chain 26 with a gear-reduction unit 28 having a low speed driving shaft 30 drivably connected by means such as a second chain 32 and suitable sprockets cooperating therewith to a shaft 34. The shaft 34 is shown with a small pinion 36 meshing with a large driving gear 38 which has at its hub 40 a small gear described below and which drives the series of gears for the corrugating and forming rollers.

Figure 4:
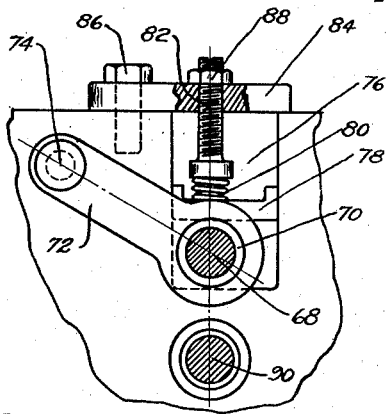
Figure 4 is a partial section on the line 4—4 of Figure 3 showing the means for temporarily releasing the upper shaft without disturbing the adjustment which determines the pressure on the corresponding spring.

There are a series of pairs of corrugating and forming rollers 42—44, 46—48, 50—52, 54—56, 58—60, 62—64, etc. These rollers are formed for progressively forming and deepening a corrugation in a strip 66 of steel drawn from the reel 16. The upper rollers 42, 46, etc., are mounted on horizontal shafts 68 which are journalled near their ends in bearings 70 (Figure 3) carried by pairs of swinging arms 72 fixedly mounted on pivots or shafts 74 mounted in fixed bearings. The bearings 70 for these upper shafts are arranged as shown in Figures 3 and 4 near the bottom ends of slots 76 in the machine frame and urged toward the bottoms of the slots 76 by shoes 78 which are urged downwardly by strong springs 80 so that the corresponding rollers are held in their lowermost positions against the material being corrugated under spring pressure.

The pressure of the springs 80 may be adjusted by turning stops 82 which are threaded into holding plates 84. Plates 84 are detachably secured by machine screws 86 to the machine frame. By loosening or removing the fastenings 86, the assembly 82—84—88 may be swung out of the way, so that the spring-held shaft may be allowed to swing upwardly in its arms 72, in case of a jamming of the strip 66 or the like. After making the desired correction or removing the jammed metal, the plates 84 are replaced and the fastenings 86 tightened or replaced to give the same adjusted tension of the springs 80 as before without requiring any new adjustment of the stops 82. The stops 82 may be locked in their adjusted positions by means such as lock nuts 88. The lower rollers 44, 48, etc., are mounted on shafts 90 rotatably mounted in fixed bearings carried by the machine frame.

The shafts 68 and 90 are provided at the ends shown in Figure 2 with pairs of intermeshing gears 92, so that each of the upper shafts 68 is driven directly and at the same speed by the corresponding shaft 90. Another gear 94 meshes with each adjacent pair of the lower series of gears 92 so that all of the gears 92 are driven at the same speed, all of the lower series in one direction and all of the upper series in the opposite direction. The center one of the lower series of the gears 92 is attached to or integral with the hub 40 of the large driving gear 38 described above.

From the foregoing description it will be seen that the gear 38 which is driven ultimately by the motor 24 drives all of the rollers 42 to 64 and draws the strip 66 through the machine, at the same time forming and gradually deepening the corrugation in this strip. In order to provide a substantially constant drag on the strip 66, the strip is urged against a plate 96 by a friction cam 98 urged in a direction to clamp the strip 66 by means such as a spring 100. A suitable block 102 of lubricating material may be urged yieldingly against the strip 66 by a spring 104.

The corrugating mechanism described above is claimed in our divisional application No. 240,230, filed November 14, 1938.

Just beyond and in line with the last pair of rollers 62—64, there is a pair of members comprising an upper roller 106 which is substantially like the roller 62 but which instead of cooperating with a lower forming roller similar to the roller 64 cooperates with a rotating bending mandrel 108. The roller 106 and mandrel 108 are driven by the last pair of gears 92. A short distance angularly around the mandrel 108 there is arranged a bending roller 110 having a profile corresponding to that of the corrugated strip, and which bends the strip on a circular arc about the mandrel. The exact curvature of the strip as it is so bent, and therefore the diameter of the conduit, is determined by the position of the roller 110 angularly with respect to the mandrel 108. The further the bending roller 110 is adjusted around the mandrel 108, the smaller the diameter of the conduit which is formed.

Figure 6:
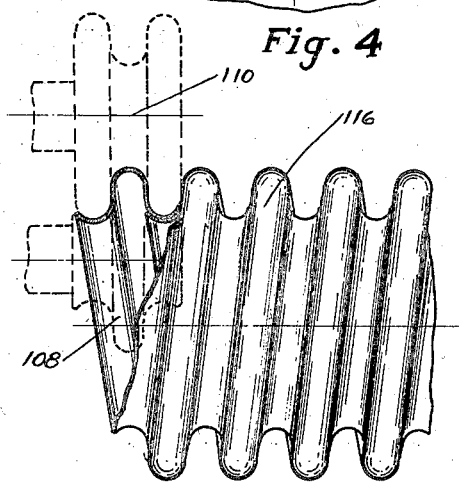
Figure 6 is a diagrammatic view partly in section and partly in elevation and showing the cooperation of the bending roller and the mandrel in forming the helically-wound corrugated conduit.

A pair of guide rollers 112 and 114 are preferably provided to guide the strip as it is so bent about the bottom of the mandrel 108 (although not necessarily or usually in contact therewith) to cause the proper overlapping of the margins of adjacent convolutions to form the spirally or helically wound conduit 116 as shown in Figure 6. The guide rollers 112 and 114 are shown mounted on slides 118 adjustably clamped in guides 120.

Figure 5:
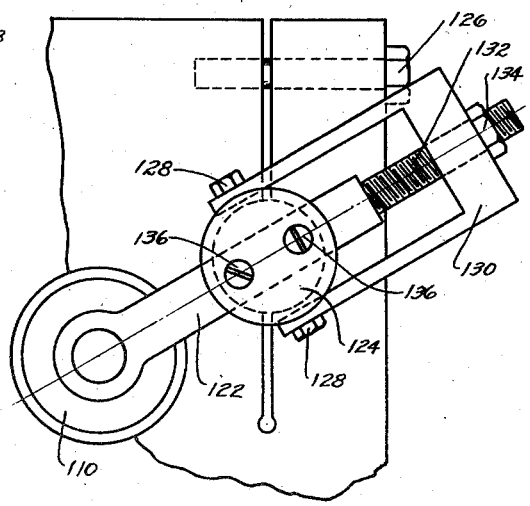
Figure 5 is a side elevation, on a larger scale than Figure 1, of the bending roller and its mounting.

In order to provide one desired adjustment of the bending roller 110 relatively to the mandrel 108, the bending roller is shown mounted at the bottom of a slide 122 slidably mounted in an angular support 124. The support 124, as shown in Figure 5, is mounted in a split bearing which may be tightened by a clamp screw 126 to hold it firmly in any desired angular position. The angularly movable support 124 has secured thereto by machine screws 128 or the like a yoke 130, through the upper end of which is adjustably threaded a stop 132 engaged by the end of the slide 122 and which may be locked in adjusted position by means such as a lock nut 134. The angularly movable support 124 is shown provided at its end with a pair of set screws 136 which can be tightened against the side of the slide 122 to hold it in adjusted position.

Figure 7:
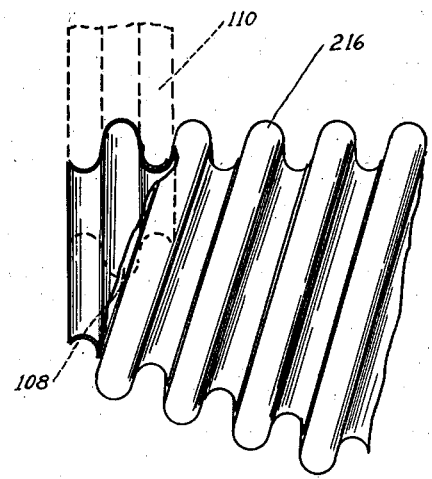
Figures 7 and 8 are views corresponding to Figure 6 but showing respectively the formation of a tube having a tapering diameter and a tube having two connected sections of different diameters but each of which sections is of uniform diameter.
Figure 8:
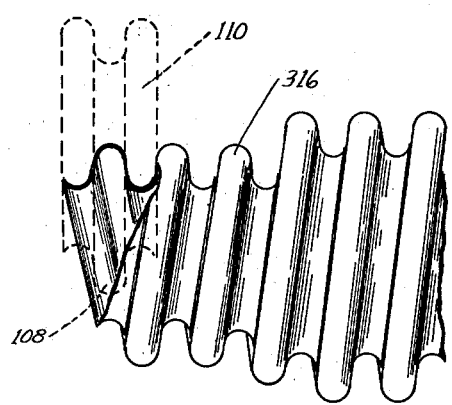

It will be seen that the above-described construction permits the adjustment of the bending roller 110 toward and from the mandrel 108 and also peripherally about the mandrel. This adjustment determines the diameter of the conduit formed on the machine. Not only may this adjustment be made before the machine is started up to make conduit of uniform diameter, but also the adjustment may be changed during the operation of the machine to form a tapered conduit 216 as shown in Figure 7, or a conduit 316 such as shown in Figure 8 which has two integrally-connected sections each of which is uniform in diameter but which sections are of different diameters.

Figure 9:
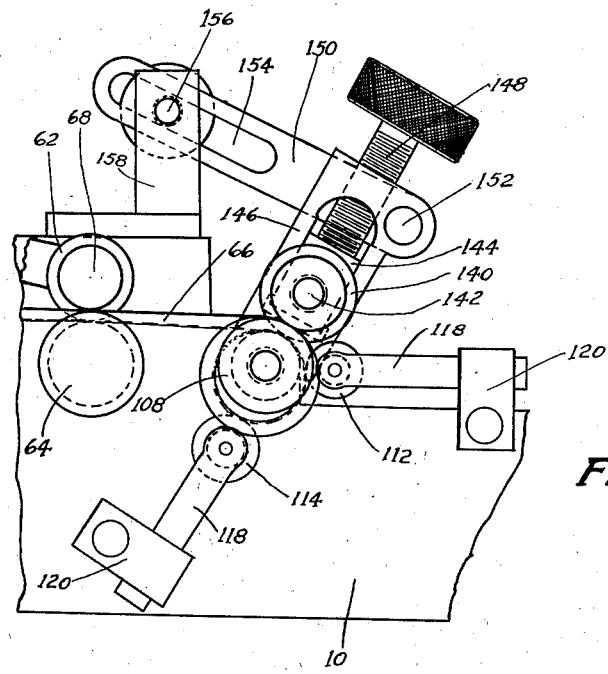
Figure 9 is a view corresponding to Figure 5 but showing the bending roller adjustable about the axis of the mandrel.

In Figure 9 there is shown an arrangement in which the bending means cooperating with the gear-driven mandrel 108 comprises a roller 140 on a shaft 142 journaled in bearing blocks 144 slidably mounted in slideways in arms 146. The shaft 142 has at its opposite end the last of the upper series of gears 92, which meshes with the corresponding last lower gear 92 on the end of the shaft of the mandrel 108. To permit the roller shaft 142 to be thus positively driven without interfering with its adjustment about mandrel 108, the arms 146 are mounted to swing about the axis of the mandrel 108.

The bearing blocks 144 are adjustable downwardly toward the mandrel by means such as screws 148 threaded through the ends of the arms 146 and bearing against the blocks. Arms 146 are held in any desired adjusted angular position by links 150 pivoted thereto at 152, and having slots 154 for clamp screws 156 securing them adjustably to fixed supports 158.

It will be seen that in this arrangement, in any position of the bending roller 140 relatively to the mandrel 108 the roller and mandrel positively draw the material forward, stretching it over the mandrel as it is bent and thereby positively giving it a "set" as it is formed.

While one illustrative embodiment has been described in detail it is not our intention to limit the scope of the invention to that particular embodiment or otherwise than by the terms of the appended claims.

We claim:

1. In a machine for forming corrugated conduits or the like having means for forming a corrugation longitudinally of a metal strip with the strip substantially straight, a rotatable but axially fixed mandrel having in a radial plane a sectional shape at its edge like that of the transverse section of the formed strip and which is arranged in line with the corrugated strip and over which the strip passes and which is smaller in diameter than the conduit formed thereon, a bending roller engaging the strip as it passes over the mandrel, a member carrying the bending roller and which is adjustable to move the roller toward and from the mandrel, and an angularly-adjustable support for said member, whereby the bending roller may be adjusted about the mandrel for winding conduits of different diameters which are substantially greater than the diameter of the mandrel.

2. In a machine for forming corrugated conduits or the like having means for forming a corrugation longitudinally of a metal strip, a rotatable but axially fixed mandrel having a radial sectional shape at its edge like that of the transverse section of the formed strip and over which the strip passes, and a bending roller engaging the strip as it passes over the mandrel and cooperating with the mandrel to wind the strip helically into a conduit substantially greater in diameter than the diameter of the mandrel.

3. In a machine for forming corrugated conduits or the like having means for forming a corrugation longitudinally of a metal strip with arcuate longitudinal flanges, a single mandrel over which the corrugated strip passes, means engaging the strip as it passes over the mandrel for bending the strip over the mandrel and winding it helically thereabout to form a conduit of greater diameter than the mandrel, said mandrel and bending roller having their peripheries transversely shaped corresponding to the transverse section of said strip to effect interlocking of opposite flanges of successive convolutions of such strip, and means for changing the position of the bending means to change the relation of the mandrel and the bending means during the operation of the machine to form a conduit having different diameters at different points in its length.

4. In a machine for forming corrugated conduits or the like having means for forming a longitudinally-corrugated strip with arcuate longitudinal flanges, a rotary circular mandrel over which said strip passes, a bending roller for bending the strip about said mandrel, said mandrel and bending roller having their peripheries transversely shaped corresponding to the transverse section of said strip to effect interlocking of opposite flanges of successive convolutions of such strip, and means for adjusting said bending roller in a substantially circular arc following the periphery of the mandrel.

5. In a machine for forming corrugated conduits or the like having means for forming a longitudinally-corrugated strip with arcuate longitudinal flanges, a rotary mandrel over which said strip passes, a bending roller for bending the strip about said mandrel, and means for adjusting said bending roller in a substantially circular arc following the periphery of the mandrel, said mandrel and bending roller being geared together and positively driven to draw the longitudinally corrugated strip therebetween and having their peripheries transversely shaped corresponding to the transverse section of said strip to effect interlocking of opposite flanges of successive convolutions of said strip.

6. In a machine for forming corrugated conduits or the like having means for forming a longitudinally-corrugated strip, a rotary mandrel over which said strip passes, a bending roller for bending the strip about said mandrel, a support mounted to swing substantially about the axis of the mandrel, means for rotatably supporting the bending roller on said support in juxtaposition to the periphery of the mandrel, and means for adjusting the angular position of said support and bending roller peripherally around the mandrel.

7. In a machine for forming corrugated conduits or the like having means for forming a longitudinally-corrugated strip, a rotary mandrel over which said strip passes, a bending roller for bending the strip about said mandrel, a support mounted to swing substantially about the axis of the mandrel, means for rotatably supporting the bending roller on said support in juxtaposition to the periphery of the mandrel, means for adjusting the angular position of said support and bending roller peripherally around the mandrel, and means for adjusting the operative distance between the bending roller and the mandrel.

8. In a machine for forming corrugated conduits or the like having means for forming a longitudinally-corrugated strip, a rotary mandrel over which said strip passes, a bending roller for bending the strip about said mandrel, a support mounted to swing substantially about the axis of the mandrel, means for rotatably supporting the bending roller on said support in juxtaposition to the periphery of the mandrel, means for adjusting the angular position of said support and bending roller peripherally around the mandrel, and means for adjusting the operative distance between the bending roller and the mandrel, said mandrel and bending roller being geared together and positively driven to draw the longitudinally corrugated strip therebetween.

9. In a machine for forming corrugated conduits or the like having means for forming a longitudinally-corrugated strip, a rotary mandrel over which said strip passes, a bending roller for bending the strip about said mandrel, a support mounted to swing substantially about the axis of the mandrel, means for rotatably supporting the bending roller on said support in juxtaposition to the periphery of the mandrel, means for adjusting the angular position of said support and bending roller peripherally around the mandrel; and a guide-roller adjustably supported relatively to the periphery of the mandrel positioned to guide the strip about the mandrel after it leaves the bending roller.

10. An apparatus for forming a longitudinally corrugated strip having arcuate longitudinal flanges into a corrugated conduit or the like comprising a rotatable mandrel over which the strip passes and a bending roller engaging the strip as it passes over the mandrel and cooperating with the mandrel to wind the strip helically into a conduit greater in diameter than the diameter of the mandrel, said mandrel and bending roller having their peripheries transversely shaped corresponding to the transverse section of said strip to effect interlocking of opposite flanges of successive convolutions of said strip.

11. An apparatus for forming a longitudinally corrugated strip having arcuate longitudinal flanges into a corrugated conduit or the like comprising a rotatable mandrel over which the strip passes and a bending roller engaging the strip as it passes over the mandrel and cooperating with the mandrel to wind the strip helically into a conduit greater in diameter than the diameter of the mandrel, and means for adjusting said bending roller toward and from the mandrel, said mandrel and bending roller having their peripheries transversely shaped corresponding to the transverse section of said strip to effect interlocking of opposite flanges of successive convolutions of said strip.

12. An apparatus for forming a longitudinally corrugated strip having arcuate longitudinal flanges into a corrugated conduit or the like comprising a rotatable mandrel over which the strip passes and a bending roller engaging the strip as it passes over the mandrel and cooperating with the mandrel to wind the strip helically into a conduit greater in diameter than the diameter of the mandrel, said mandrel and bending roller having their peripheries transversely shaped corresponding to the transverse section of said strip to effect interlocking of opposite flanges of successive convolutions of said strip, and means for adjusting said roller about the axis of the mandrel to form conduits of different sizes.

13. An apparatus for forming a longitudinally corrugated strip into a corrugated conduit or the like comprising a rotatable mandrel having a radial sectional shape at its edge corresponding to that of the transverse section of the formed strip and over which the strip passes and a bending roller engaging the strip as it passes over the mandrel and cooperating with the mandrel to wind the strip helically into a conduit greater in diameter than the diameter of the mandrel, means for adjusting said bending roller toward and from the mandrel, and means for adjusting said roller about the axis of the mandrel to form conduits of different sizes.

14. An apparatus for forming a longitudinally corrugated strip having arcuate longitudinal flanges into a corrugated conduit or the like comprising a rotatably mounted mandrel over which the strip passes, bending means engaging the strip as it passes over the mandrel and cooperating with the mandrel to wind the strip helically into a conduit of greater diameter than the diameter of the mandrel, said mandrel and bending roller having their peripheries transversely shaped corresponding to the transverse section of said strip to effect interlocking of opposite flanges of successive convolutions of said strip, said mandrel and bending means being adjustable with respect to each other so as to form conduits of different diameters.

15. An apparatus for forming a longitudinally corrugated strip having arcuate longitudinal flanges into a helical corrugated conduit or the like comprising a rotatably mounted mandrel over which the strip passes, bending means engaging the strip as it passes over the mandrel and co-operating with the mandrel to wind the strip helically into a conduit of greater diameter than the diameter of the mandrel, said mandrel and bending roller having their peripheries transversely shaped corresponding to the transverse section of said strip to effect interlocking of opposite flanges of successive convolutions of said strip, and means for driving said mandrel and bending means at a speed faster than the normal feeding speed of the strip.

16. An apparatus for forming a longitudinally corrugated strip having arcuate longitudinal flanges into a helical corrugated conduit or the like comprising a rotatably mounted mandrel over which the strip passes, bending means engaging the strip as it passes over the mandrel and co-operating with the mandrel to wind the strip helically into a conduit of greater diameter than the diameter of the mandrel, said mandrel and bending roller having their peripheries transversely shaped corresponding to the transverse section of said strip to effect interlocking of opposite flanges of successive convolutions of said strip, and means for driving said mandrel and bending means at a speed faster than the normal feeding speed of the strip, said mandrel and bending means being adjustable with respect to each other so as to form conduits of different diameters.

HALE W. PARRISH.
LAWRENCE G. DICKESON.